United States Patent [19]
Bradley

[11] 3,828,836
[45] Aug. 13, 1974

[54] SAFETY WHEEL AND TIRE SECURING ASSEMBLY

[76] Inventor: Curtis E. Bradley, 4517 Calle Ventura, Phoenix, Ariz. 85018

[22] Filed: Dec. 13, 1972

[21] Appl. No.: 314,538

[52] U.S. Cl. ........ 152/158, 152/330 L, 152/330 RF, 152/400, 152/405
[51] Int. Cl. ........ B60c 5/16, B60c 7/24, B60c 17/04
[58] Field of Search ........... 152/158, 330, 388, 399, 152/400, 401, 409, 410, 158, 330 L, 330 RF, 405

[56] References Cited
UNITED STATES PATENTS

| | | | |
|---|---|---|---|
| 1,321,466 | 11/1919 | Meyer | 152/399 X |
| 2,040,645 | 5/1936 | Dickinson | 152/158 |
| 3,212,548 | 10/1965 | Drazin | 152/158 |
| 3,435,872 | 4/1969 | Johnson | 152/158 |
| 3,451,457 | 6/1969 | Leyer | 152/158 |
| 3,587,702 | 6/1971 | Kaunitz | 152/158 |
| 3,638,701 | 2/1972 | Rossler et al. | 152/158 |
| 3,682,219 | 8/1972 | Lindley | 152/158 |

*Primary Examiner*—M. Henson Wood, Jr.
*Assistant Examiner*—Howard Beltran
*Attorney, Agent, or Firm*—John A. Robertson

[57] ABSTRACT

This specification discloses four basic embodiments of a safety wheel and tire assembly that is mounted on the rim of a conventional vehicle wheel. In each embodiment, a safety wheel is provided in the form of a two-part safety rim which is erected into a position in which the beads of the tire are clamped against the flanges of the wheel rim and a lubricated rolling surface is provided at a radius appreciably less than the radius of the tire when inflated. Mechanism is provided to adjust the safety rim into a position for installation and removal by applying lateral pressure to the side walls of the tire. Latches hold the safety rim in erected position and are released either by the lateral pressure aforesaid or by a tool that is inserted through a hole in the wheel rim that is normally closed by a removable plug.

20 Claims, 21 Drawing Figures

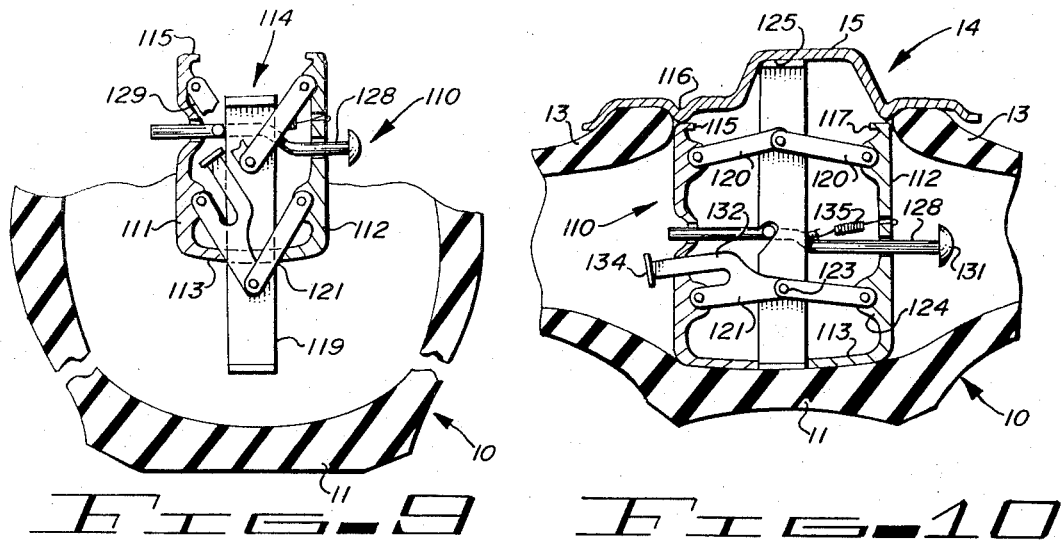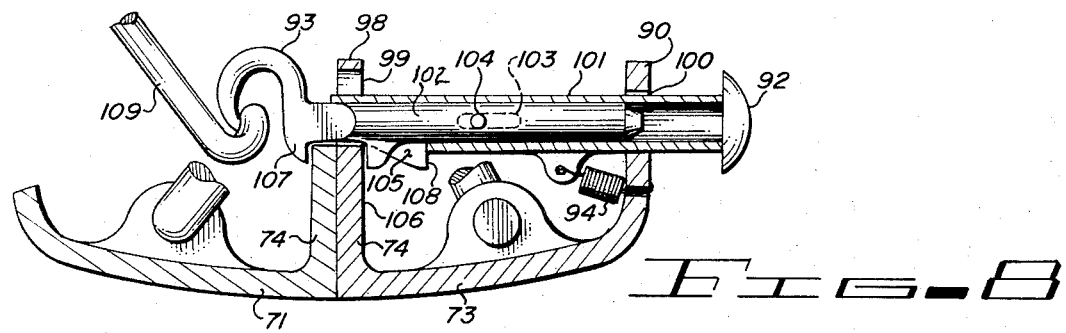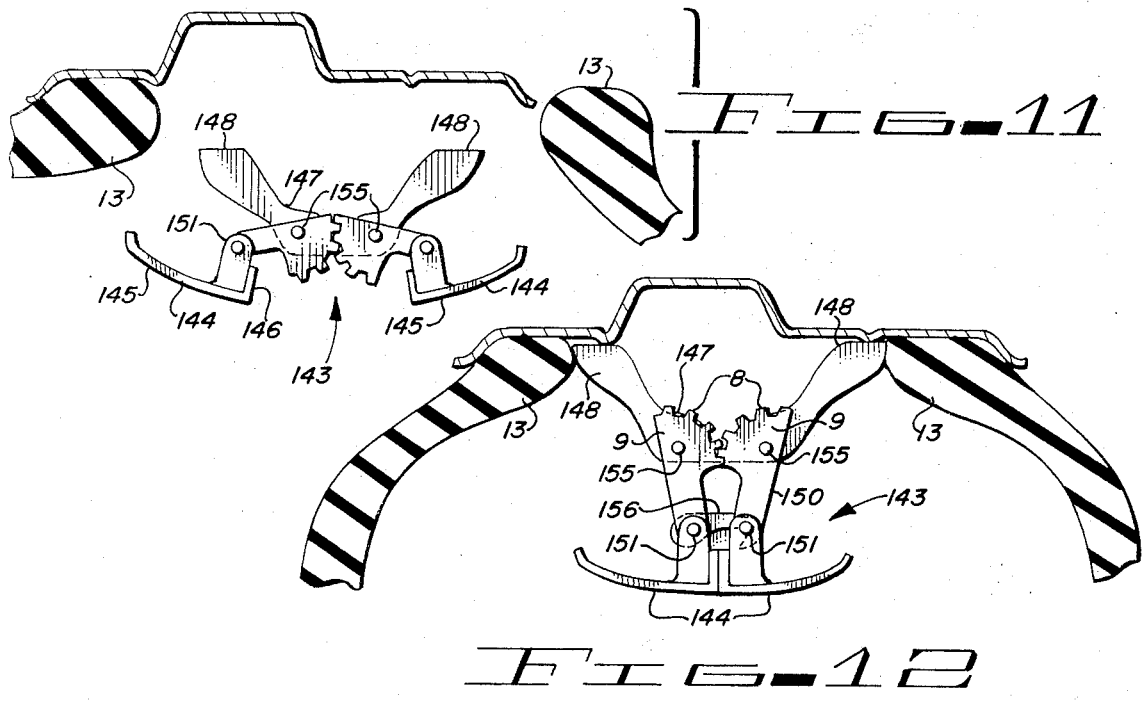

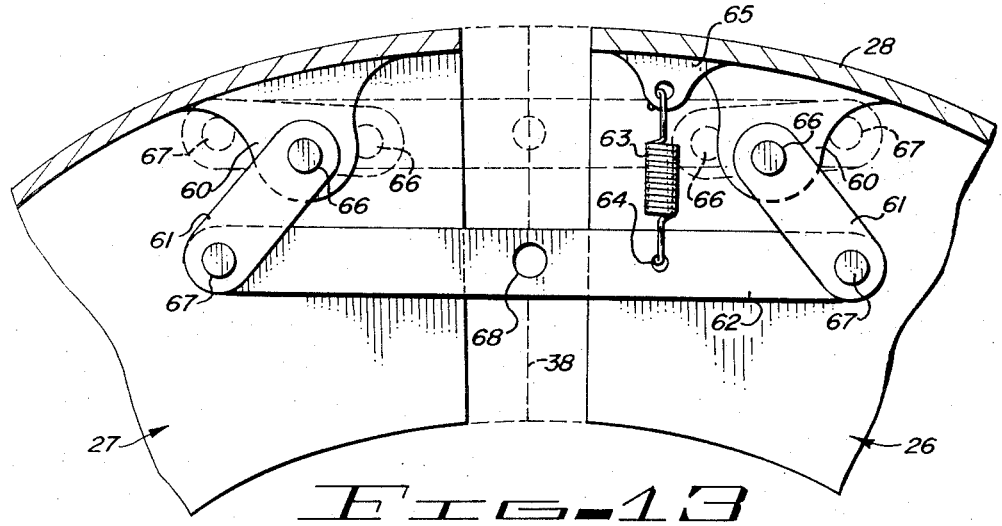
FIG-13
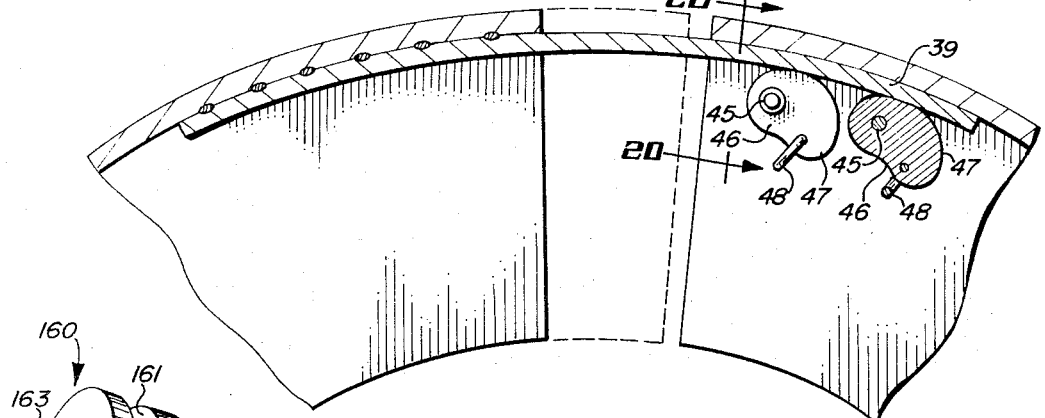
FIG-14
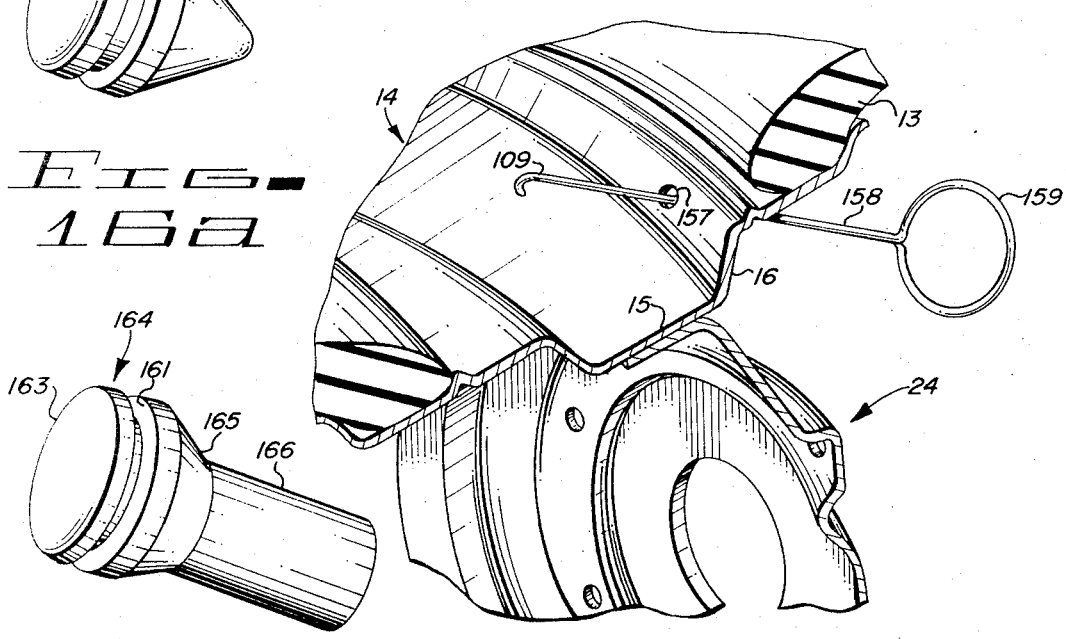
FIG-16a
FIG-16
FIG-15

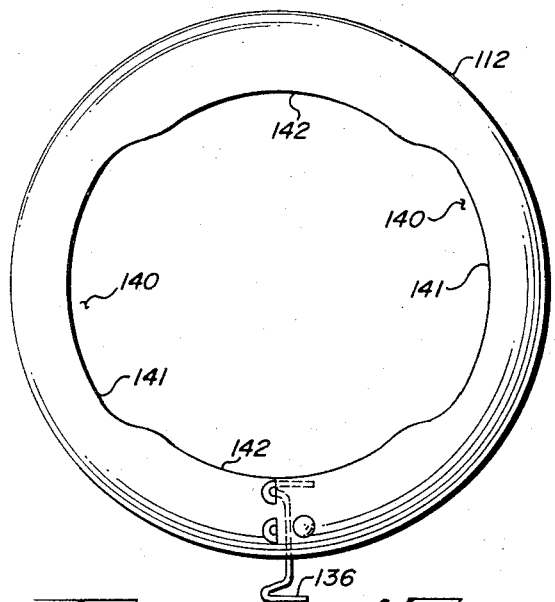
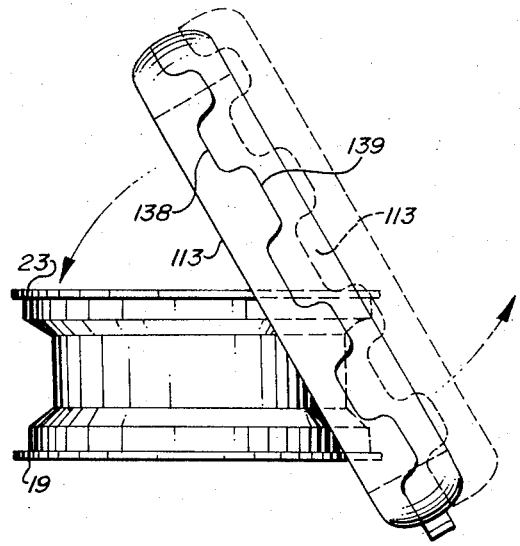
FIG-17  FIG-18
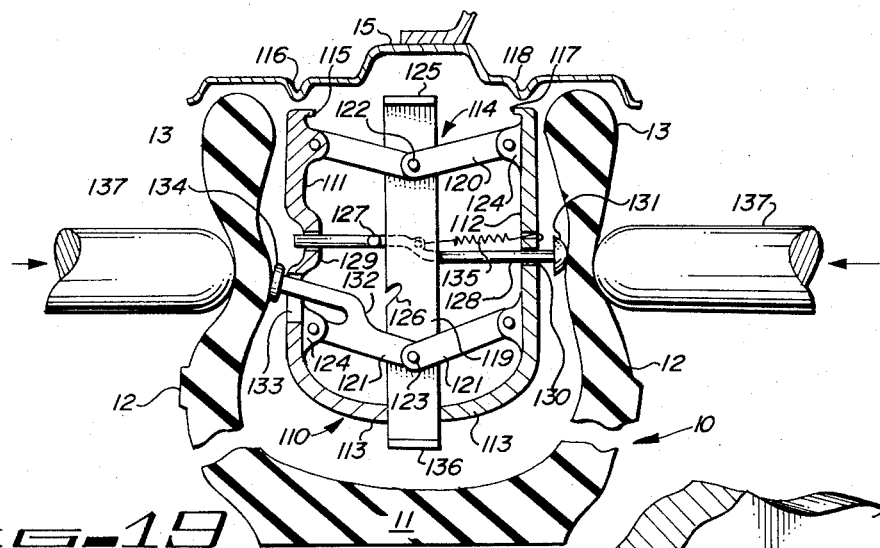
FIG-19
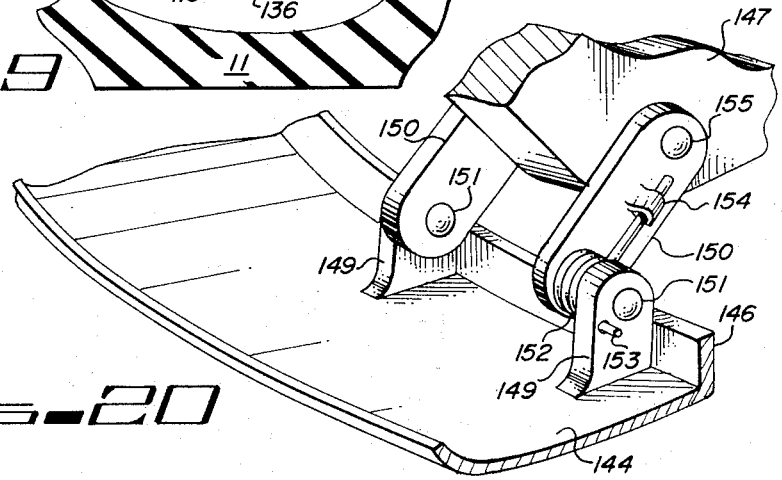
FIG-20

SAFETY WHEEL AND TIRE SECURING ASSEMBLY

The present invention relates to safety wheel and tire assemblies and is concerned primarily with the provision of a safety wheel in the form of a two-part rim which may be adjusted to facilitate its installation within a vehicle tire on the wheel rim and erected into an effective position in which the beads of the tire are restrained against flanges on the wheel rim, and a rolling surface is provided having a radius intermediate the radii of the tire in deflated and inflated conditions.

BACKGROUND OF THE INVENTION

At the present time the deflation of a tire while a vehicle is in operation presents serious hazards to the safety of the driver and the likelihood of damage to the vehicle. The deflation may be sudden and abrupt, such as caused by a blowout, or may be more gradual, such as caused by a slow leak. In either case, movement of the vehicle on a deflated tire impairs driver control and thus increases the likelihood of injury to the driver and damage to the vehicle considered as an entirety.

Moreover, when the vehicle is operated on a deflated tire, the tire itself is impaired due to the flexing of the side walls thereof and an increase in temperature created by the rolling action. Should the tire come off the wheel rim, there is a strong likelihood that the wheel rim will be damaged.

The foregoing factors have been recognized by those working in this art and so-called safety tires have been provided which clamp the tire beads against the wheel rim flanges when the tire becomes inflated. This prevents the tire from coming off of the wheel rim and, to a partial extent, reduces the hazards above outlined. Workers in this field have also recognized the desirability of providing an auxillary rolling surface of a radius less than that of the tire when inflated and greater than that of the wheel rim. Such an auxiliary rolling surface reduces the likelihood of damage to the tire. However, known devices of this type are difficult to remove after a tire becomes deflated. This is particularly true when the tire beads are clamped against flanges of the wheel rim as above outlined.

OBJECTS OF THE INVENTION

With the foregoing conditions in mind, the present invention has in view the following objectives:

1. To provide, in a safety wheel and tire assembly, a safety rim including two relatively movable rim elements which are adapted to assume an adjusted position to facilitate installation and removal, or an erected effective position in which the beads of a tire are restrained against the flanges of the wheel rim and which present a rolling surface of a radius appreciably less than that of the tire when inflated and greater than that of the wheel rim.

2. To provide, in a safety wheel and tire assembly of the character aforesaid, a safety rim having a rolling surface that is lubricated to minimize damage to the tire when it engages the rolling surface during movement of the vehicle when the tire is deflated.

3. To provide a two-part safety rim of the type noted which is secured in erected effective position by a latch mechanism and spring biased into an installation and removal position, together with means operable from the exterior of the tire to release the latches.

4. To provide, in a safety rim of the kind described, latch mechanism which is susceptible of release by applying lateral pressure to the external surfaces of the side walls of the tire.

5. To provide a safety rim of the kind described in which the safety rim is manipulated into effective erected position by application of pressure to the external surfaces of the tire.

6. To provide, in a safety wheel and tire assembly of the character aforesaid, a safety rim including latches for maintaining it in erected position with access to the latches for dismantling purposes being provided in the inflation valve hole in the tire upon removal of the valve stem therefrom.

7. To provide, in a safety wheel and tire assembly of the type noted, a wheel rim having an access opening normally closed by a removable plug and through which a tool may be inserted when the plug is removed to release the latch mechanism of the safety rim.

8. To provide a safety rim of the character aforesaid comprising two or more arcuate segmental members, each having an extent of substantially 90° to 180° and which are hingedly connected at one or more points where the segmental members meet and are secured in collapsed effective position by a latch located at a point diametrically opposite to the hinged connection.

9. To provide, in a safety rim of the kind described, a hinge in the form of a leaf spring which biases the segmental members into an extended position to facilitate installation and removal.

10. To provide a two-part safety rim of the type aforesaid which includes a portion on each segment which is adapted to enter the drop center of a wheel rim and with side portions which restrain the tire beads.

11. To provide, in a safety wheel and tire assembly of the character described, a safety rim comprising two generally cylindrical members of fixed diameters which are movable axially relative to each other, together with a plurality of pairs of pivotally connected bell cranks having their outer ends pivotally connected to the cylindrical members and feet at the other ends which restrain the tire beads when the cylindrical members are in operating position.

12. To provide, in a safety rim of the type noted in the preceding paragraph, spring means for urging the ends of the bell crank with the feet thereon together and latches which secure the cylindrical members together against the influence of the spring means.

13. To provide, in a safety wheel and tire assembly of the kind described, a safety rim comprising two relatively movable discs of fixed diameter having flanges at their outer peripheries defining a rolling surface and toggle mechanism operative by pressure applied to the tread surface of the tire to expand the discs into positions in which their inner edges clampingly engage the tire beads.

14. To provide a safety rim of the type noted in the preceding paragraph with latch mechanism for holding the toggle mechanism in position in which the discs are expanded.

15. To provide, in a safety rim of the kind described in paragraphs 13 and 14, toggle mechanism including a radially extending operating member which is actuated by radial pressure on a tread portion of the tire to move said discs apart.

16. To provide, in a safety wheel and tire assembly of the type aforesaid, a safety rim comprising two annular members of fixed diameter which are relatively axially movable, a plurality of shoes engageable with a wheel rim to restrain the tire beads against the flanges on the wheel rim and a corresponding number of sets of links which connect the shoes to the annular members whereby movement of said annular members towards each other erect said shoes into effective position, while movement of said annular members away from each other adjust said shoes into a position to facilitate installation and removal.

17. To provide, in a safety rim of the character set forth in the preceding paragraph, links of each set which are pivotally connected to the annular members with torsion springs at the pivot to move said links in a direction which spreads said annular members.

18. To provide a safety rim in which the safety rim is assembled into the tire by normal deflection of the tire beads over the safety rim to be enclosed by the tire prior to mounting the tire on the wheel.

19. To provide a safety rim which when enclosed by the tire, the tire including the safety rim is readily mountable and dismountable from the wheel on which it is to be operated.

20. To provide a safety rim which when erected within a tire and wheel assembly will be accurately located so that the total assembly will run with good balance, and when the tire is deflated the safety rim will roll with a smooth and concentric action.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing four embodiments of the basic principles outlined above.

In the first embodiment, a safety rim is provided in the form of two arcuate segmental members, each having an annular rolling surface, a side wall and an inner arcuate wall formed with an inwardly extending rib which is received in a drop center of a wheel rim. These segmental members meet at a point where they are hingedly connected by a leaf spring which biases the members into an expanded position to facilitate installation and removal. The end of one member remote from the hinge carries a curved tongue which is received within the arcuate outer wall of the other segmental member and clamped thereagainst by a cam latch. A spring is provided which holds the cam in clamping engagement with the tongue and a cam release is provided in the form of a link which extends outwardly from the side wall of the safety rim and to the end of which pressure is applied by deforming the side wall of the tire when the latter is deflated.

In the second embodiment, two annular or generally cylindrical members of fixed diameter are mounted for relative axial movement on a plurality of pairs of bell cranks. The end of the outer arm of each bell crank is pivotally connected to one of the cylindrical members, while the end of the other arm of each bell crank is formed with a foot which clampingly engages a tire bead and wheel rim when the cylindrical members are moved together. Latches are provided for holding the cylindrical members together and a tension spring is connected across the ends of the inner bell crank arms to bias these ends together and thus tend to expand the cylindrical members to facilitate installation and removal.

In the third embodiment, two discs of fixed diameter are relatively axially movable. The outer periphery of each disc is formed with an inturned arcuate flange, with the flanges cooperating to provide a rolling surface. The inner edges of the discs are engageable with a wheel rim to restrain the tire beads against the flanges thereon. A toggle mechanism is provided for either moving the discs together or away from each other. This toggle mechanism comprises two sets of links. The inner end of each link is joined to a central radially movable operating member by a common pivot. The outer end of each link is pivotally connected to one of the discs. A latch is provided for holding the operating member in a radially inward adjusted position in which the discs are spread and a latch release is provided in the form of a lateral rod which extends through an opening in one of the discs, while an actuating arm for moving the operating member radially outwardly is connected to one of the links and passes through an opening in the other of the discs. The latch release and the actuating member are rendered effective by lateral pressure applied to the side walls of a tire when deflated.

In a fourth embodiment, the safety rim comprises a pair of axially movable annular members of fixed diameter, a plurality of annularly spaced shoes, each having a pair of end flanges engageable with a wheel rim to clamp tire beads against flanges thereon, and a set of links connecting each shoe to said annular members. Each annular member has a pair of radially, inwardly extending lugs adjacent the meeting edge thereof. A link is pivotally mounted at one end on each of these lugs and its other end is pivotally connected to the shoe associated with that set of links. A torsion spring is associated with each pivotal connection of a link to the lug and biases the links radially outwardly to spread the annular members. When the annular members are spread apart, the pivotal connections of the links to a shoe are located radially inwardly of the pivotal connection to the lugs. Thus, when lateral pressure is applied to the annular members to move them together, the links are swung to move the shoe connected thereto radially inwardly.

For a full and more complete understanding of the invention, reference may be had to the following description and the accompanying drawings wherein.

Figure 5:
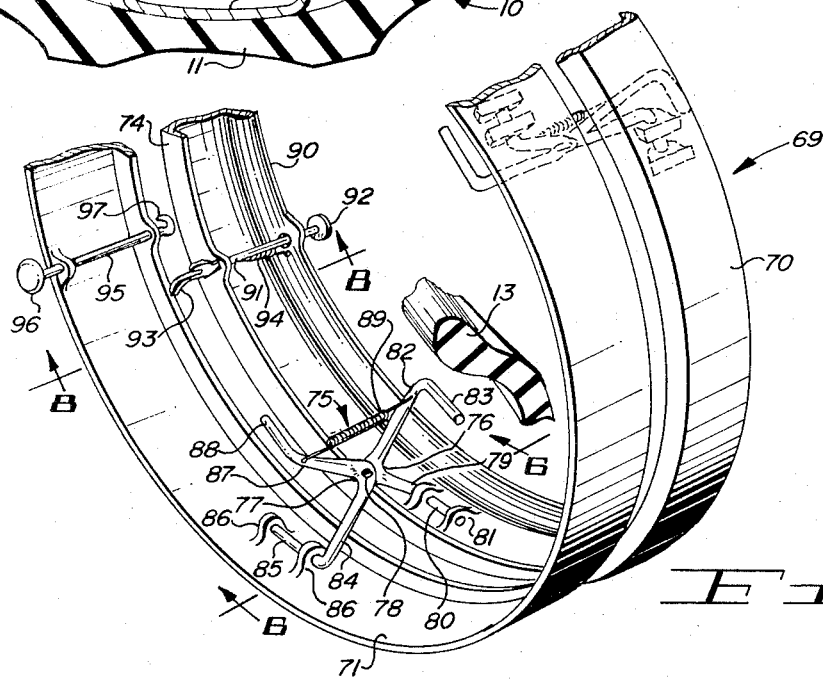
FIG. 5 is a perspective of a second embodiment of the safety rim with parts broken away.
Figure 6:
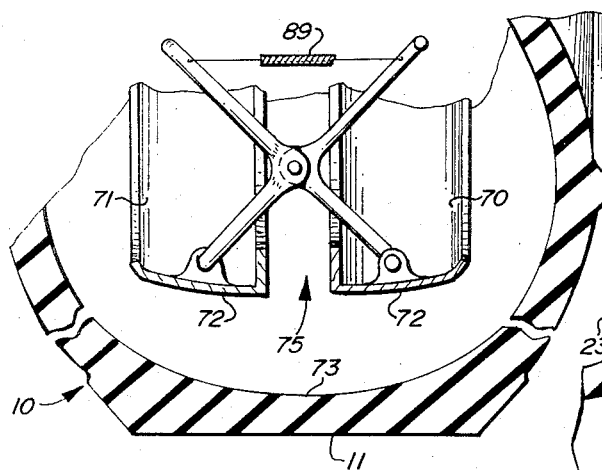
FIG. 6 is a detailed section through the safety rim of FIG. 5, taken on the plane of the line 6—6 of FIG. 5 and illustrating a portion of the tire normally shaped.
Figure 7:
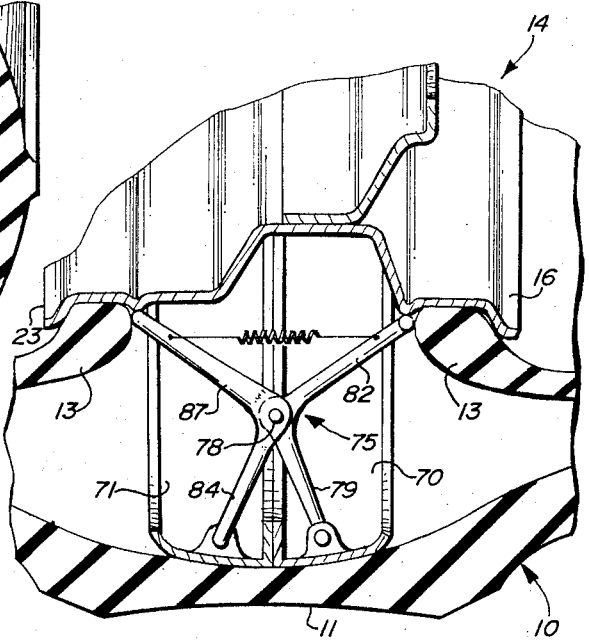

FIG. 7 is a section similar to FIG. 6 depicting the tire as deflated;

FIG. 8 is a detailed section on an enlarged scale of one of the latches utilized in the safety rim of FIG. 5, being taken on the plane of the line 8—8 of FIG. 5;

FIG. 9 is a radial section through a portion of a tire when normally shaped and a third embodiment of a safety rim;

FIG. 10 is a view similar to FIG. 9 with the tire deflated and illustrating the wheel rim;

FIG. 11 is a radial section through a wheel rim, tire beads and a fourth embodiment of the safety rim, with the parts being shown in exploded relation;

FIG. 12 is a radial section depicting the safety rim of FIG. 11 in erected effective position;

FIG. 13 is a side view on an enlarged scale of a modified latch which may be used in the safety rim of FIGS. 1–4, with parts in section and other parts in elevation;

FIG. 14 is a view similar to FIG. 13 illustrating the latch of FIGS. 1–4;

FIG. 15 is a perspective view showing portions of the wheel and safety rims in exploded relation and showing a hooked tool as inserted in the access opening in the wheel rims;

FIG. 16 is a detailed perspective of one plug which is used to close the access opening in the wheel rim;

FIG. 16a is a detailed perspective of a modified plug;

FIG. 17 is an elevation of the safety rim of FIGS. 9 and 10 with the toggle mechanism omitted;

FIG. 18 is a side elevation showing how the safety rim of FIG. 17 is applied to a wheel rim;

FIG. 19 is a radial section through wheel rim and tire when deflated, illustrating how lateral pressure is applied to the latch release and toggle actuating member of the toggle mechanism of FIGS. 9 and 10, and FIG. 20 is a detailed perspective taken on an enlarged scale depicting one link connection between the shoe and annular member of the safety rim of FIGS. 11 and 12.

DESCRIPTION OF THE EMBODIMENT OF FIGS. 1-4 INCLUSIVE AND 13 AND 14

Figures 1, 2, 3:
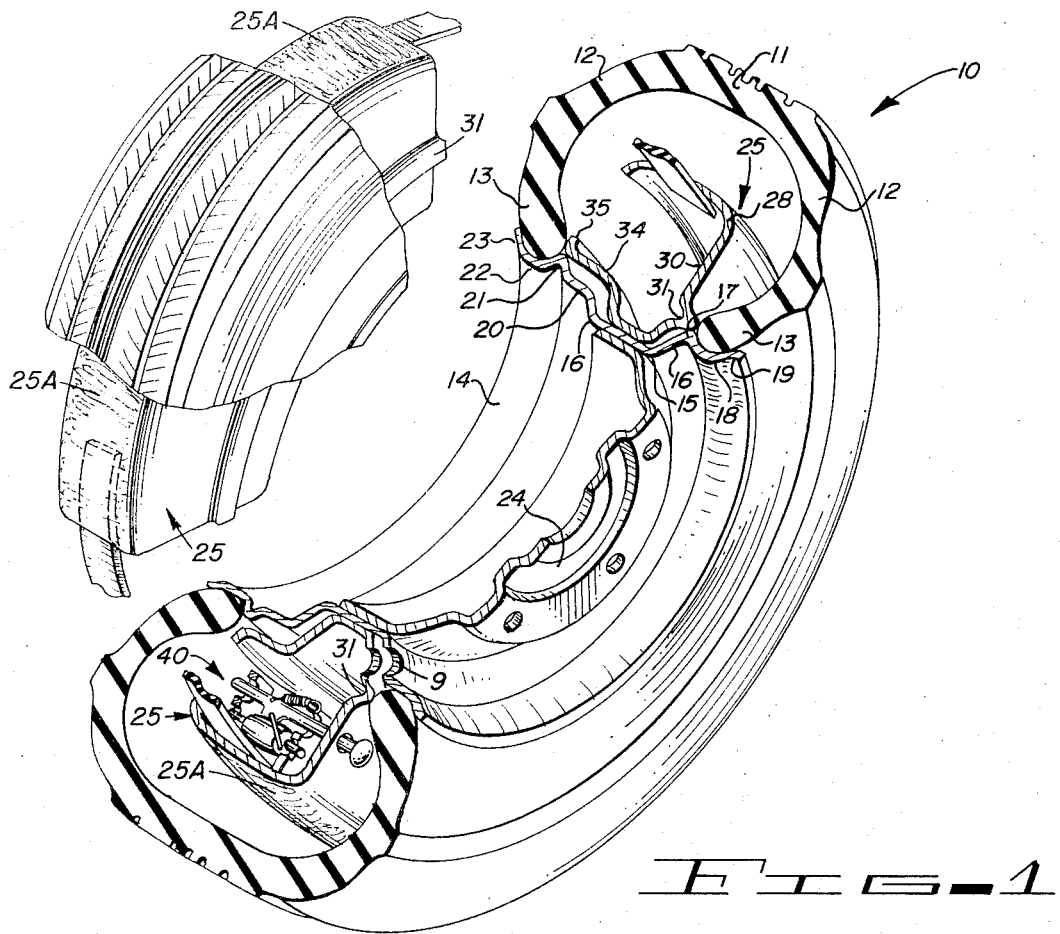
FIG. 1 is a perspective of one embodiment of the safety wheel and tire assembly of this invention with the tire and safety rim broken away to permit illustration of the mechanism in the interior of the tire.
FIG. 2 is a view in side elevation with portions of the tire and safety rim broken away and depicted in section.
FIG. 3 is a detailed radial section taken on an enlarged scale through a portion of the wheel and safety rim.

Referring now to the drawings wherein like reference characters denote corresponding elements throughout the several views, and first more particularly to FIG. 1, a conventional inflatable tire is identified in its entirety by the reference character 10. The tire 10 includes a tread portion 11, and side walls 12 integrally joined to tread portion 11 and terminating in beads 13. Tire 10 is mounted on a wheel rim which is designated generally 14. Wheel rim 14 is of metal and includes a drop center 15. Extending radially and axially outwardly from drop center 15 are inclined walls 16, one of which is formed with an access opening 9 which is closed by a plug in the manner as plug 160, FIG. 16a. At the end of the side wall 16 on the outer side, speaking with reference to the rim when installed, is a bead 17. Extending axially outwardly from bead 17 is a generally concave wall 18 terminating in a flange 19. One of the beads 13 is received in a concave wall 18 between beads 17 and flange 19. Extending axially inwardly from the other inclined side wall 16 is a cylindrical wall 20 terminating at a radial rib 21. Extending axially inwardly from rib 21 is another concave wall 22 which terminates in a flange 23. The other of the tire beads 13 is received in this concave wall 22 between rib 21 and flange 23. It will be understood that wheel rim 14 is mounted on a conventional wheel disc shown at 24.

A safety rim is designated in its entirety at 25. It comprises two segmental, arcuate members designated generally 26 and 27. As illustrated these parts 26 and 27 have an extent of substantially 180°. Others are segments of 90° and 120° and are also usable. So far as wall structure is concerned, they are generally similar. Upon referring to FIG. 3, it will be noted that each includes an outer tread wall 28 having a rolling surface 29 which is arcuate in an axial direction to conform to any curvature which may be present on the inner surface of the tread portion 11 of tire 10. Also, it may be lubricated in any desired manner, such as by having a lubricant 25A such as a grease, applied thereto or embedded in the material of wall 28. Projecting radially inwardly from the outer edge of tread wall 28 is a radial wall 30 which is formed adjacent to its inner edge with an axially outwardly projection rib 31. At its inner edge, radial wall 30 is integrally joined to a cylindrical wall 32 which is received in the drop center 15 when the safety rim 25 is erected in effective position. Extending radially inwardly and slightly axially outwardly from the inner edge of cylindrical wall 32 is a slightly inclined wall 33. Extending axially inwardly from the inner edge of wall 33 is a cylindrical wall 34 terminating in a flange 35. It is noted that the walls 32 and 34 have been described as cylindrical, because when the parts 26 and 27 are assembled this wall of each part complements the corresponding wall of the other part to define a cylinder. So far as each part 26 and 27 is concerned, they are semi-cylindrical. The flange 35 engages the inner side of tire bead 13 as shown in FIG. 1.

The two parts 26 and 27 meet at a line designated 36 as shown in FIG. 2 when safety rim 25 is collapsed or erected into effective position. They are hingedly connected by a metallic leaf spring 37 which is welded or otherwise secured to the inner surfaces of the tread walls 28. Leaf spring 37 biases the parts 26 and 27 into an open or spread position. The parts 26 and 27 also meet in what is substantially abutting relation along a line shown at 38 in FIG. 2 which is diametrically opposite to the meeting line 36. In this connection, it is noted that there might be a slight spacing between the ends at 36 and 38 when the safety rim is installed in effective position. Secured to the underface of the tread wall 28 of part 26 is an arcuate guide in the form of a metallic tongue 39. This tongue 39 projects an appreciable distance into the part 27 where it engages the inner surface of the tread wall 28 of that part. As the parts 26 and 27 are moved together, a cam latch designated generally 40 is effective on tongue 39 to clamp this tongue against tread wall 28 of part 27 to secure the parts 26 and 27 in collapsed or erected effective position.

Referring now more particularly to FIG. 3, extending inwardly from tread wall 28 of part 27 are two radial flanges 41 and 42. Each of the flanges 41 and 42 are formed with an opening 43 which receives a bearing 44. A shaft 45 has its ends journalled in the bearings 44 and carried by the shaft 45 is a cam 46.

While only a single cam 46 is shown in FIGS. 1, 2 and 3, it may be desirable to include a multiplicity of such cams which are circumferentially spaced apart as illustrated in FIG. 14. Each of these cams 46 has an outer curved surface 47 which engages the inner surface of tongue 39 under varying degrees of pressure as determined by the angular position of the cam on the shaft 45. Secured to each cam 46 along a line offset with respect to shaft 45 is a yoke 48. A rod 49 is slidably mounted in openings 50 in flanges 41 and 42 and passes through another opening 51 in radial wall 30 of part 27. Rod 50 is formed with a knob or button 52 on its outer end. A tension coil spring 53 has one end anchored to flange 42 as indicated at 54 and its other end to rod 50 as indicated at 55. Rod 50 is formed with an ear 56 and a link 57 has one end pivoted to ear 56 as indicated at 58 and its other end to yoke 48 as indicated at 59. The normal tendency of spring 53 is to urge the rod 50 axially outwardly, which motion is translated through line 57 and yoke 48 to a radial outward swinging movement of cam 46 about the shaft 45 to force the cam into clamping engagement with tongue 39. Rod 50 may be pushed inwardly by applying lateral pressure to button 52 through a side wall 12 of the tire when deflated to move the cam 46 radially inwardly against the influence of spring 53, and thus release the latching effects afforded by the cam to permit the parts 26 and 27 to be swung outwardly under the influence of leaf spring 37.

Operation of FIGS. 1-4, 13 and 14

Safety rim 25 is assembled within tire 10 and the assembly installed on wheel rim 14 with beads 13 received in concave walls 18 and 22. This seating of the tire beads requires inflation of the tire. Following seating of the beads, the tire is deflated. Pressure is then applied to tread portion 11 of tire 10 at two diametrically opposite points which is effective to press the tire tread portions 11 against the tread walls 28 of the safety rim 25, to move the parts 26 and 27 together and close the gaps at lines 36 and 38. This action closes the open semicircular segments and latches the open ends, thus forming the tread portions 28 into a substantially continuous cylinder. This closing action decreases the radius of the rim, forcing the semi-cylindrical walls 32 into drop center 15 with which it engages and the rib 31 and flange 35 into clamping engagement with beads 13. Thus, the tire beads 13 are clamped against wheel rim flanges 19 and 23. The tire 10 is now inflated to a required degree in which the tread walls 28 considered as an entirety occupy a position generally midway between tread portion 11 and wheel rim 14. It is believed that in a preferred installation, the distance between tread walls 28 and tread portion 11 of the tire will be sixty percent of the distance between wheel rim 14 and tread portion 11.

Figure 4:
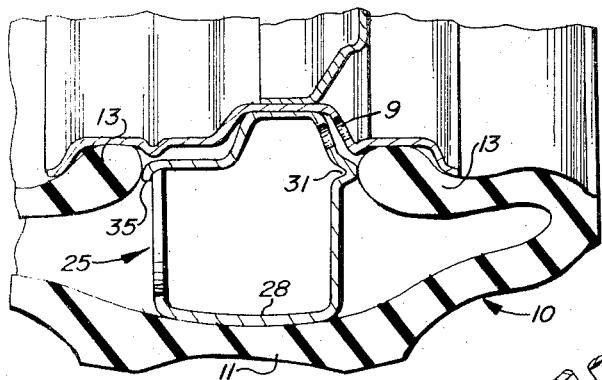
FIG. 4 is a radial section illustrating the tire and safety rim of FIGS. 1, 2 and 3, with the tire deflated.

When tire 10 becomes deflated for any cause, the vehicle on which it is mounted may be driven to a service center by riding on the safety rim 25 with the tread portion 11 engaging inner rim walls 28 as shown in FIG. 4. In this portion, it will be noted that the beads 13 are firmly restrained in position against the flanges of the wheel rim by rib 31 and flange 35. When it is desired to expand safety rim 25 into dismounting or removal position, lateral pressure is applied through side walls 12 of tire 10 to force the rod or rods 50 axially inwardly to release tongue 39 from cams 46. Spring 37 is now effective to spread the parts 26 and 27 into open position which permits the removal of the tire and safety rim assembly from the wheel rim.

The cam latch may also be released by using a hook tool that is inserted through the opening in the wheel rim in a manner to be later described.

Latch Modification

FIG. 13 illustrates a modified form of latch which may be used to secure the parts 26 and 27 together at line 38. Depending from tread wall 28 of each of the parts 26 and 27 is an ear 60. Pivotally mounted on each ear 60 is a link 61. Extending between the other ends of the links 61 is a bar 62. A tension coil spring 63 has one end anchored to bar 62 as indicated at 64 and its other end to a tab 65 depending from one of the tread walls 28. This spring exhibits a tendency to pull the bar 62 radially outwardly. The pivotal connections of the rings 61 to ear 60 are designated 66, while the pivotal connections of the ends of the bar 62 to links 61 are designated 67. With the parts 26 and 27 assuming the separated or spread position depicted by full lines in FIG. 13, the pivot points 67 are below the pivot points 66. When pressure is applied through the tread portion 11 of the tire to tread walls 28 to move the parts 26 and 27 together, spring 63 moves bar 62 upwardly into the dotted line position of FIG. 13 in which the pivot points 67 are radially outward of pivot points 66, that is, they are moved past dead center. At the same time, the points 66 are shifted circumferentially towards each other into the dotted line position. This is the latched position of the parts 26 and 27. Bar 62 is also formed with an aperture 68 which may be engaged by hooked tool in a manner to be later described to pull the bar radially inwardly and past dead center to release the latch.

Description of the Embodiment of FIGS. 5-8 Inclusive

Referring now to FIG. 5, a safety rim is referred to in its entirety at 69. It comprises two generally cylindrical members 70 and 71 of fixed diameter. Each of these members 70 and 71 has a rolling surface that is slightly arcuate as indicated at 72 to conform to the curvature of the inner surface 73 of tread portion 11 of tire 10. Extending radially inwardly from the adjacent edges of members 70 and 71 are radial flanges 74. The members 70 and 71 are relatively movable axially, that is, they may be expanded or collapsed. Angularly spaced apart and mounted on the interior of these members 70 and 71 are a plurality of bell crank mechanisms, each of which is designated generally at 75. There should be at least three of such mechanisms, with four being indicated as the preferred member. Each of the bell crank mechanisms 75 comprises an outer bell crank 76 and an inner bell crank 77. The two are pivotally connected as indicated at 78. Bell crank 76 has an outer arm 79 formed with a turned-out end 80 which is pivotally mounted on a pair of lugs 81 which are carried on the inner face of member 70. It also includes a radially inward arm 82 formed with a foot 83 which is adapted to engage the rim of the wheel at 16 as well as the outer bead 13 of a tire 10. Bell crank 77 also has an outer arm 84 having an out-turned end 85 that is pivotally mounted on lugs 86 extending inwardly from part 71 and an inner arm 87 formed with a foot 88 which engages the wheel rim at 17 as well as the outer bead 13 of the tire. A tension coil spring 89 has its ends secured to arms 82 and 87 adjacent to the feet thereon and tends to draw these arms together and thus expand the members 70 and 71. Member 70 is formed with an outer flange 90 and a latch rod 91 is slidable in openings formed in flanges 74 and 90. Rod 90 has an actuating button 92 at its outer end and a hook 93 on its inner end which is adapted to latchingly engage flange 74 on member 71. Rod 91 is biased into an axially outward direction by a tension spring 94.

Another latch rod 95 is similarly mounted on member 71 and has an operating member 96 on its outer end and a hook 97 which engages flange 74 on member 70. It will be understood that the latch rods 91 and 95 are positioned closely adjacent to one another to form a pair and there will be at least two of such pairs included in the safety rim 69.

Details of each of the latch rods 91 and 95 are illustrated in FIG. 8. In this connection, it is noted that only one latch rod such as that shown at 91 is illustrated and described because latch rod 95 is a substantial duplication thereof with the exception that it is mounted on member 71 rather than the member 70. Inner flange 74 is formed with an ear 98 having an opening 99. Outer flange 90 has an opening 100 substantially in alignment with opening 99. Latch rod 91 considered as an entirety comprises a tubular member 101 and a solid rod 102 slidable therein. Tubular member 101 carries the operating button 92, while the solid rod 102 carries the hook 93 on its projecting end. Tubular member 101 is formed with a pair of diametrically opposed slots represented by the broken lines at 103. Solid rod 102 carries a transverse pin 104, the ends of which are slidable in the slots 103.

Adjacent to flange 74, tubular member 101 is formed with a longitudinal slot at 105 through which depends a lug 106 that depends from rod 102. Another lug 107 depends from rod 102 immediately below hook 93. As shown in FIG. 8, the flanges 74 on members 70 and 71 are held between the lugs 106 and 107 when the latch rod is in effective position. Depending from tubular member 101 is a cam 108 which is adapted to engage the edge of opening 99 to raise that end of the tube and solid rod 102 to lift legs 106 and 107 out of engagement with flanges 74. This action takes place when lateral pressure is applied to button 92 against the influence of spring 94 which normally holds the tubular member 101 in a retracted position.

While latch rod 91 is adapted to be released by lateral pressure applied through the side walls of the tire as above explained, it is also susceptible of being released by a hooked tool, an end portion of which is shown at 109 and in engagement with hook 93. This hooked tool will be inserted through an access opening in the wheel rim in a manner to be later described.

Operation of FIGS. 5-8

The cylindrical members 70 and 71 are held in the separated position of FIG. 6 by the springs 89 of the several bell crank sets. The safety rim 69 in this condition is inserted in a tire 10, after which the tire is installed on a wheel rim 14 with the tire beads 13 engaging the flanges 16 and 23. Lateral pressure is now applied through the side walls 12 of the tire to collapse or move the cylindrical members together into the position depicted in FIG. 7 in which the flanges 74 are in abutting engagement. They are secured in this position by the latch rods 91 and 95 of each set. As this action takes place, the outer arms 79 and 84 of the bell cranks of each set move together while the inner arms 82 and 87 separate to move the feet 83 and 88 into location on the rims at 16 and 17 and into clamping engagement with tire beads 13.

When the tire is deflated as shown in FIG. 7, tire tread 11 will engage the surfaces 72 of the members 70 and 71 which are lubricated as pointed out above in connection with the safety rim of FIG. 1.

When it is desired to remove the tire 10 and safety rim 69 from wheel rim 14, lateral pressure is applied through side walls of the tire to engage the buttons 92 and 96 of each set of latch rods 91 and 95 to disengage lugs 106 and 107 from flanges 74, whereupon the springs 89 draw the bell crank arms 82 and 87 together which spreads the bell crank arms 71 and 84 and the cylindrical members 70 and 71. As this action takes place, the feet 83 and 88 are removed from their clamping engagement with tire beads 13.

Description of the Embodiment of FIGS. 9, 10, 17, 18 and 19

The safety rim of this embodiment is referred to in its entirety by the reference character 110. It comprises a pair of ring-like plates 111 and 112, each having an inturned flange 113 at its outer periphery and toggle mechanism designated generally 114. Plates 111 and 112 are of fixed diameter. Plate 111 has a flange 115 at its inner edge which engages a bead 116 on the wheel rim to center the plate. Likewise, plate 112 has a flange 117 on its inner edge which engages a bead 118. These beads 116 and 118 generally correspond to the beads 21 and 17 on the safety rim 14 of FIG. 1. There are a plurality of toggle mechanisms 114 angularly spaced about and between plates 111 and 112, but only one is herein described in detail. Thus, as shown in FIGS. 9, 10, 19, the toggle mechanism 114 comprises a radially movable operating bar 119, an inner set of links 120 and an outer set of links 121. The inner end of links 120 are pivotally connected to bar 119 by a common pivot 122, while the inner ends of the outer set of links 121 are connected to bar 119 by a common pivot 123. The outer ends of links 120 and 121 are pivotally connected to lugs 124 which project inwardly from plates 111 and 112. The inner end of bar 119 is formed with a foot 125 which is received in the drop center 15 of the wheel rim when the bar reaches its innermost limit of radial movement. Bar 119 is also formed with an undercut notch 126 which receives a projection 127 on a latch rod 128 when the latch bar is in its axial inward position.

Plate 111 is deformed to provide an inwardly projecting boss 129 which is formed with an opening that slidably receives one end of latch rod 128. Plate 112 is formed with an opening 130 which slidably receives the other end portion of latch rod 128, the outer end of which is provided with an operating button 131.

The outer link 121 which is pivoted to plate 111 is provided with an actuating member in the form of an offset arm 132 which extends through an opening 133 in plate 111 and carries an operating button 134 on its outer end. Tension coil spring 135 has one end anchored to plate 112 and its other end to latch rod 128 to bias the latter towards plate 112.

Actuating bar 119 passes through slots formed in flanges 113 and projects therebeyond where it is provided with an end flange 136.

At this point it is well to note that inward radial pressure is applied to end flange 136 of bar 119 through tread portion 11 of the tire to move the bar 119 radially inwardly. This action is effective on links 120 and 121 to spread the plates 111 and 112 so that their inner edges engage tire beads 13 and force them into clamping engagement with the flanges on the wheel rim. This clamping action takes place just as the pivot points 122 and 123 pass dead center. In this position, the projection 127 on latch rod 128 is moved into notch 126 to latch the bar 199 in this inner radial position.

To release the toggle mechanism 114 and move the plates 111 and 112 to their collapsed or contracted position, lateral pressure is applied to the side walls 12 of the tire as by pressure tools indicated somewhat diagrammatically at 137. Thus, the lateral pressure on operating button 131 of the latch rod releases the latch, while lateral pressure on the operating button 134 causes an outward swinging movement of the outer link 121 to which it is attached to move the bar 119 radially outwardly.

Upon referring to FIG. 18, it will be noted that the flanges 113 are formed with recesses 138 and projections 139, with the recesses 138 on one flange receiving the projections 139 on the other flange when the plates 111 and 112 are in their contracted position. Due to the fact that plates 111 and 112 are of fixed diameter, it is necessary that provision by made to clear either of the wheel rim flanges 19 or 23 when the tire with the safety rim 110 therein is installed on a wheel rim.

FIG. 17 illustrated a plate 112 as having two diametrically opposed cutouts or recesses 140 which provide arcuate inner edges 141 of greater diameter than the arcuate edge portions 142. Thus, installation of safety rim 110 is easily accomplished using the cutouts 140 by placing the plates 111 and 112 at a slight angle to the face of the wheel rim and then sliding safety rim 110 as the entirety in axial and radial directions, and then in a radial direction opposite to the first mentioned radial direction after the first half of the safety rim 110 is passed onto the wheel rim in order to clear the opposite semi-circle of the plates 111 and 112. This completes the installation of the safety rim 110 on the wheel rim.

It is believed that the manner in which the safety rim 110 of FIGS. 17, 18 and 19 operates and its installation are evident from the description of parts set forth above.

When the tire is deflated, the tread portion 111 engages the flanges 113 but the end flanges 136 on the rods 119 constitute slight projections which will cause the wheel to roll with a bumpity-bump action which noticeably draws the attention of the driver to the deflated condition.

Description of the Embodiment of FIGS. 11, 12 and 20

The safety rim of this embodiment is designated generally 143. It comprises a pair of annular members 144 of fixed diameter, each having a rolling surface 145 of a curvature corresponding to the inner surface of the tread portion 11 of the tire, and an inwardly extending flange 146 on the edge which confronts the other member. Safety rim 143 also includes a plurality of angularly spaced shoes 147, each having a pair of feet 148. When safety rim 143 is erected into effective position, feet 148 clampingly engage wheel rim and tire beads 13 as shown in FIG. 12.

Extending radially inwardly from each of the annular members 144 and adjacent to the flange 146 thereon are a pair of spaced lugs 149, as is more clearly shown in FIG. 20. Each of a pair of links 150 has its outer end pivotally mounted on a lug 149 as by a pivot pin 151. A torsion spring 152 is associated with pivot 151 ans has one end anchored to a lug 149 as shown at 153 and its other end to a link 150 as shown at 154. The inner end of each link 150 is pivotally connected to a shoe 147 as indicated at 155.

Referring now to FIG. 11, it will be noted that pivots 155 are disposed radially inwardly of pivots 151. Thus, as lateral pressure is applied to the annular members 144 through the side walls of the tire, these members will be moved together and thus move pivots 151 together towards each other. This will cause the links 150 to be swung radially inwardly and move the shoe 147 attached thereto radially inwardly into the position of FIG. 12. In this position, it will be noted that the pivots 151 are closer together than pivots 155, which means that dead center has been passed.

To insure that links 150 will rotate in unison, the ends remote from pivots 151 are formed with extensions 9 having confronting arcuate surfaces formed with teeth 8. These teeth on the two extensions mesh as illustrated, thus assuring that links 150 pivot together.

A latch is represented by broken lines at 156, but details of this latch are not disclosed other than to point out that it may be of the same type illustrated in FIG. 8.

Obviously there will be a plurality of shoes 147 angularly spaced apart with four being indicated as the preferred minimum number. Also, there will be a set of lugs 149 and links 150 for each shoe.

The operation involved in erecting or dismantling safety rim 143 is substantially the same as that described in connection with the previous embodiments. Thus, the angular members 144 are expanded into the spread position of FIG. 11 when the tire is first installed on a wheel rim. After being so positioned, lateral pressure through the side walls of the tire moves the annular members 144 together into the position of FIG. 12 in which the feet 148 of the shoes 147 clampingly engage wheel rim and tire beads 13. They are secured in this position by latches 156. When the safety rim is to be dismantled, lateral pressure is applied through the side walls of the tire to release the latches 156 in the manner above described in connection with the latch of FIG. 8.

The Access Opening

While the embodiments above described are all susceptible of being dismantled by applying lateral pressure through the side walls of the tire, it is deemed advisable to provide, in addition to the normal wheel rim hole opening provided for an inflation valve which can be used for insertion of a hooked tool when the valve stem is removed, an access opening in the wheel rim which permits the entry of a hooked tool for the purpose of releasing any of the latches above described. Upon referring to FIG. 15, it will be noted that wheel rim 14 is shown in exploded relation with respect to wheel 24. Inclined wall 16 on the outer side of drop center 15 is formed with an aperture 157. Tool 158 has the hook 109 at one end and a handle 159 at the other end. With the aperture 157 open, it is obvious that the hook 109 may be inserted through aperture 157 and the tool manipulated to release the latch.

When a tire is installed on wheel rim 14, it is essential that the aperture 157 be closed. To accomplish this, a rubber plug, one form of which is shown in FIG. 16a and designated 160, may be used. Plug 160 is formed with an annular groove 161 which receives the edge of inclined wall 16 which defines aperture 157. On one side of groove 161 is a short conical portion 162 which is forced through aperture 157 as the plug is positioned from the inside of the wheel rim. On the other side of groove 161 is a button 163 which provides a good abutment in preventing the plug from being blown out of the aperture 157 by air pressure. It will be understood that plug 160 being of rubber will deform sufficiently to accommodate its positioning and removal. Removal is accomplished merely by pressing the exposed end of conical portion 162 inwardly.

FIG. 16 discloses a modified form of the plug 164, which includes the same annular groove 161 and button 163 of plug 160. It also includes a conical portion 165 from which projects a cylindrical extension 166. Plug 164 is also inserted from the inside of inclined wall 16 and when in effective position, extension 166 projects an appreciable distance beyond the external surface of wall 16 where it may be engaged by a tool such as a pair of pliers to pull the plug from aperture 157 outwardly rather than pushing it inwardly as in the case of plug 160.

In each of the safety rims above described, those portions of the rim providing the rolling surface may be provided with a flat spot to create a "whump-whump" noise when the tire is deflated and the vehicle is in operation to warn the driver of the deflated condition. This flat spot may not be necessary in the embodiment of FIGS. 9, 10, 17, 18 and 19, because this function will be performed by the end portion 136 of bar 119.

While preferred specific embodiments are herein disclosed, it is to be clearly understood that the invention is not to be limited to the exact constructions, mechanisms and devices illustrated and described because various modifications of these details may be provided in putting the invention into practice.

What is claimed is:

1. For installation in a conventional inflatable tire including a flexible tread portion and flexible side walls which terminate in beads, and which tire is mounted on a wheel rim including a drop center and flanges on the opposite sides thereof which are engaged by the tire beads, a safety rim comprising:
   a. two relatively movable members in said tire which are adjustable into at least an erected effective functioning position and an installation and removal position;
   b. each of said members having a part defining a rolling surface when the members are erected and which rolling surface has a diameter substantially midway the diameter of the tread portion of the tire when the tire is inflated and that of said drop center;
   c. means on said members for restrainingly engaging the tire beads when said members are erected;
   d. mechanism within said tire connecting said members in assembled relation and including elements in operating relation to inner surfaces of the tire when said tire is deflated and external pressure is applied to the tire to render said mechanism responsive to said pressure to move said member into erected effective position;
   e. latches on said members for securing said members in erected position and including release means responsive to lateral pressure applied externally of the side walls of the tire, and
   f. means operatively mounted on said members to move said members into a dismantled ineffective position when said latches are released.

2. The safety rim of claim 1 in which the rolling surface is lubricated.

3. The safety rim of claim 1 in which said wheel rim is formed with an access opening adjacent to said drop center, together with a removable plug closing said access opening.

4. The safety rim of claim 3 in which the plug comprises a head and a conical portion separated by an annular groove which receives the edge of the wheel rim defining the access opening, said plug being removable from said access opening by pressure applied thereto externally of the wheel rim.

5. The safety rim of claim 4 in which the plug has a cylindrical extension projecting from the conical portion thereof and which projects externally of the wheel rim when the plug is in position closing said access opening, said extension being engageable by a tool to pull the plug through the access opening.

6. The safety rim of claim 1 in which said relatively movable members are two arcuate segmental members with a spring hingedly connecting said arcuate members where they meet at one end and the latch mechanism is associated with the other meeting ends, said spring constituting the means for moving the members into dismantled position when the latch is released.

7. The safety rim of claim 6 in which the latch comprises an arcuate tongue having one end secured to one of the segmental members and the other end engaging the other of said segmental members, a cam mounted on said last mentioned segmental member and engaging said tongue, and spring means biasing said cam into clamping engagement with said tongue.

8. The safety rim of claim 7 in which each of said segmental members has a semi-cylindrical flange at its outer edge and which flanges define the rolling surface, a radial wall and an inner cylindrical wall having portions which clampingly engage the tire beads.

9. The safety rim of claim 7 in which there is a multiplicity of said cams.

10. The safety rim of claim 7 in which an axially extending cam release rod is associated with said cam and is operable by lateral pressure applied externally through a side wall of a tire.

11. The safety rim of claim 1 in which said relatively movable members are two generally cylindrical members of fixed diameter and are relatively movable axially, said connecting means comprising a plurality of angularly spaced apart sets of bell cranks, each set of bell cranks comprising a pair of bell cranks each having an outer arm and an inner arm, said bell cranks being pivotally connected at the joinder of the inner and outer arms, the ends of said outer arms being pivotally connected to said cylindrical members, feet on the ends of said inner arms which clampingly engage said tire beads and wheel rim when the safety rim is erected, the latches secure said cylindrical members in contracted position and spring means biasing said bell cranks into a position in which the outer arms are expanded.

12. The safety rim of claim 11 in which each of said cylindrical members is formed with an inwardly extending radial flange on the edge more closely adjacent to the other cylindrical member and the latch clampingly engages said flanges.

13. The safety rim of claim 11 in which a spring means takes the form of a tension coil spring having its ends connected to the inner bell crank arms.

14. The safety rim of claim 1 in which said relatively movable members are ring-like plates of fixed diameters and the connecting means comprises a plurality of angularly spaced apart toggle mechanisms, each of said toggle mechanisms including a radially movable operating bar having an outer end engageable by the tread portion of a tire when external pressure is applied thereto to move said bar radially inwardly and cause said toggle to spread said plates, each of said plates having an inner end portion which clampingly engages a tire bead and wheel rim when said plates are expanded by the toggle.

15. The safety rim of claim 14 in which the inner edges of said ring-like plates are formed with diametrically opposed recesses which define areas of a diameter greater than that of the flanges on the wheel rim to permit installation of the safety rim on the wheel rim.

16. The safety rim of claim 14 in which each toggle mechanism includes a pair of inner links pivotally mounted on a common pivot to said operating bar and the outer ends of which are pivotally connected to said plates, and a pair of outer links pivotally mounted on a common pivot to said operating bar and the outer ends of which are pivotally connected to said plates.

17. The safety rim of claim 16 in which the operating bar is formed with a notch and a latch comprises an axially movable latch rod having a projection receivable in said notch, a spring biasing said latch rod into the position in which said projection is received in the notch, said latch rod extending through an opening in one of the plates and engageable by pressure applied externally through the side wall of a tire to release said latch.

18. The safety rim of claim 17 in which one of the outer links carries an actuating arm which extends through an opening in the other of said plates whereby an end thereof is subject to lateral pressure applied through another side wall of the tire to move said operating bar radially outwardly.

19. The safety rim of claim 1 in which said relatively movable members take the form of a pair of annuli of fixed diameter, a plurality of angularly spaced lugs, each of said lugs comprising a pair of lugs on each annulus, a link pivotally mounted at its outer end on each lug, a plurality of shoes corresponding in number to the number of said sets of lugs with the outer end of each link pivotally connected to each shoe, each of said shoes having a pair of feet which clampingly engage a tire bead and wheel rim when the safety rim is erected, said pivotal connections of said links to said shoes being disposed radially inwardly of the pivotal connection of said links to said lugs whereby contracting movement of said annuli causes said lugs and links to move said shoes into erected position, a latch mechanism for securing said annuli in contracted position and torsion springs associated with the pivotal mountings of said links on said lugs to move said shoes radially outwardly when the latch mechanism is released.

20. The safety rim of claim 19 in which each annulus is formed with an inwardly extending radial flange on the edge which confronts the other annulus and the lugs are located closely adjacent to said flanges, said latch mechanism cooperating with said flanges to secure said annuli in contracted position.

\* \* \* \* \*